United States Patent [19]

Feldcamp

[11] 4,005,635
[45] Feb. 1, 1977

[54] METHODS AND EQUIPMENT FOR MACHINING ELECTRODES

[76] Inventor: Edward George Feldcamp, Tudor Cottage, Church End Twyning, Tewkesbury, Gloucestershire, England

[22] Filed: Nov. 4, 1974

[21] Appl. No.: 520,741

[52] U.S. Cl. .............................. 90/11 C; 29/25.11; 125/12; 269/7
[51] Int. Cl.² ............................................ B23C 3/00
[58] Field of Search .................... 90/11 C, DIG. 22; 269/7; 29/559, DIG. 1, DIG. 4; 51/277, 283; 125/12, 30; 156/6, 268; 408/145

[56] References Cited
UNITED STATES PATENTS

| 995,537 | 6/1911 | Hertner et al. ............... 90/DIG. 22 |
| 2,412,644 | 12/1946 | Muller ................................. 125/12 |
| 2,446,672 | 8/1948 | Sirp .................................. 29/25.17 |
| 3,790,152 | 2/1974 | Parsons ................................ 269/7 |

FOREIGN PATENTS OR APPLICATIONS

| 1,164,937 | 3/1964 | Germany ............................... 269/7 |

*Primary Examiner*—Francis S. Husar
*Assistant Examiner*—W. R. Briggs
*Attorney, Agent, or Firm*—Young & Thompson

[57] ABSTRACT

A rough-cut blank is machined to provide a spark erosion electrode for use in the manufacture of an extrusion tool by bonding the blank to a base plate, fixing the base plate to a milling machine table and milling the blank. The milled blank is subsequently detached from the base plate by breaking the bond between the blank and the base plate.

3 Claims, 3 Drawing Figures

METHODS AND EQUIPMENT FOR MACHINING ELECTRODES

FIELD OF THE INVENTION

This invention relates to the machining of electrodes to be used in the spark erosion of die openings in extrusion tools.

BACKGROUND OF THE INVENTION

In present manufacture of the copper electrodes used for the foregoing purpose, hand finishing is to a large extent employed. The electrode shape is marked out on a copper or copper-tungsten block of the appropriate thickness, unwanted metal being cut away to provide a rough blank ready for finishing, which is largely a filing operation. Although some machine finishing is employed this is necessarily limited by the necessity for clamping the blank on to the machine table, and the presence of the clamps not only complicates such machining as can be performed but also precludes total machining.

SUMMARY OF THE INVENTION

According to the invention a method of machining a rough-cut electrode blank to provide a spark erosion electrode for use in the manufacture of an extrusion tool, comprises the steps of bonding the blank to a base plate, fixing the base plate to the table of a milling machine, milling the blank while in the machine and subsequently detaching the milled blank from the base plate by breaking the bond between the blank and the base plate.

Preferably the base plate is supported in the machine on a coordinate machine table, and/or a rotary table may be employed to obtain accurate angles. Preferably the blank is attached to the base plate by a low temperature solder which fuses at a temperature, for example between 180° and 200° C, which is low enough to prevent blueing of the blank and obliteration of the marking out which has to be followed during finishing. It is important that heating of the blank before attachment to the base plate, and during fusing of the solder to detach the machined blank, should be accomplished by reasonably uniform heating of the blank whereby to avoid thermal distortion.

The finish of an electrode made in accordance with the invention has a number of important advantages, some of which will now be enumerated. One is that the milled finish provides truly vertical faces with horizontal tool marks which do not affect the finish of the subsequent spark erosion of a die opening, as compared with the vertical marks which obtain with hand filling — these references to the horizontal and vertical being appropriate to the use of a milling machine with a horizontal table and a vertical spindle. Further advantages are that thin electrode sections can have accurately parallel side walls, which is impossible of achievement by even the most skilled hand filing, and the end face of the milling tool can be taken down below the blank into the solder so that the blank is machined over its full depth.

The base plate may be a plain steel plate with a well-tinned surface. Alternatively, the plate may be of laminated construction, with a top steel or copper layer to which the blank can be soldered and a bottom steel layer which can be located on a magnetic machine table. An electrical heating element may be sandwiched between the two layers. A rack may be provided in which one or more base plates can be placed while being heated prior to machining or for removal of a machined blank. The base plates preferably slide into the rack as plug-in units which engage electrical supply terminals at the back of the rack.

DESCRIPTION OF THE PREFERRED EMBODIMENT

Figure 2:
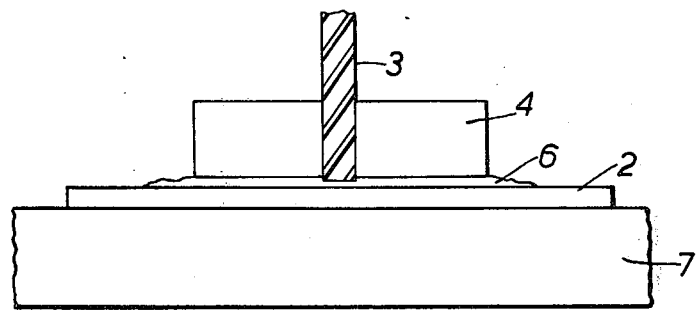
FIG. 2 illustrates the actual machining step.

The equipment used in the method comprises a flat hot-plate 1, a plain steel base plate 2 and a horizontal milling machine, i.e. which traverses the work horizontally and has a vertical spindle axis. The milling machine is not illustrated in full in the drawings, but FIG. 2 shows the lower end of an end mill 3 mounted in the milling machine spindle and machining one side of an electrode blank 4.

Figure 1:
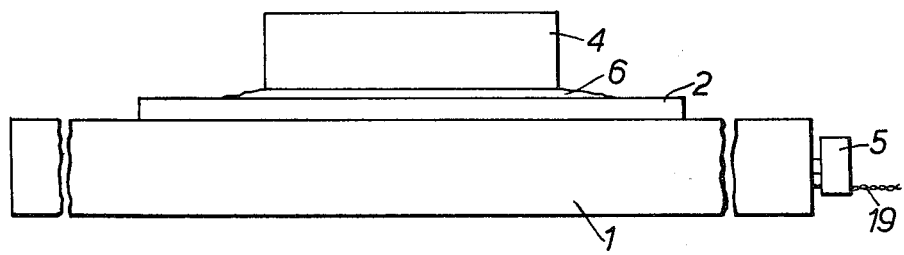
FIG. 1 illustrates an initial stage of the method.

A rod-type thermostat 5 fitted in the hot-plate 1 controls the temperature thereof and is connected in series with electrical supply leads 19 which energizes an internal heating element. A generally suitable temperature is between 180° C and 200° C, i.e. sufficient to melt the solder 6 on the well-tinned upper surface of the base plate 2 when the latter is placed on the hot-plate 1 as shown in FIG. 1. When the solder melts, the base plate 2, together with the blank 4 previously placed on top of the solder, is removed from the hot-plate 1 and is allowed to cool down so that the solder 6 sets and the blank 4 is firmly attached to the base plate 2.

A time switch (not illustrated) may be employed to switch off after the desired temperature has been reached and held for an adequate time to melt the solder 6 on the top of the plate 2.

When ready for final machining a rough cut electrode blank 4 is placed on the base plate 2 and both placed on the hot-plate 1, and as the base plate 2 heats up the solder 6 and the blank 4 are heated to above the melt point of the solder. The uniform heating of the blank 4 which is thus obtained avoiding any possiblity of thermal distortion of the blank. To speed up operations a heated base plate 2 may be kept at all times on the hot-plate 1, with the solder 6 molten and ready to receive the next blank 4. The base plate 2 and blank 4 are allowed to cool down until the solder 6 has set, and they are then located on a horizontal magnetic coordinate machine table 7, as shown in FIG. 2, which is desirably capable of rotary indexing movement. Machining of the blank is carried out with horizontal milling cutter movements with the end face of the cutter 3 taken down into the solder 6, as can be seen in FIG. 2, so that the blank is machined over its full depth.

After milling of the blank 4 is completed, the base plate 2 and blank 4 are removed from the table 7 are replaced on the hot-plate 1, whereupon they are heated to above the solder melt point and the machined blank 4 is removed.

Figure 3:
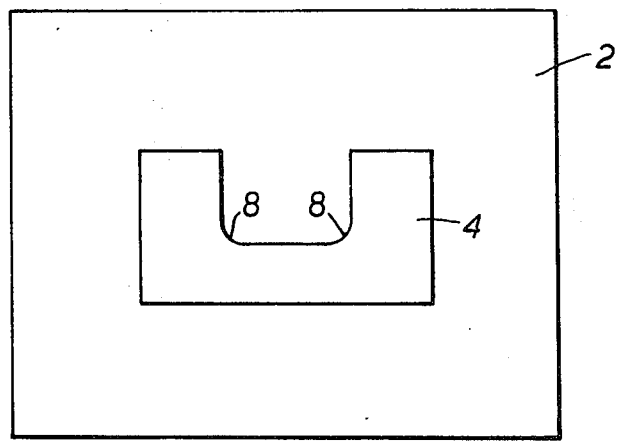
FIG. 3 illustrates the finally machined blank still attached to a base plate.

The shape of the blank 4, shown in FIG. 3 in the fully-machined condition still attached to the base plate 2, is such that the entire periphery can be machined provided the diameter of the cutter 3 is appropriate to the internal radii 8. If these radii were, however, sharp corners they would have to be finished by hand filing in the conventional manner although the advantage of machining the rest of the periphery would still be obtained.

Although the invention has been described above with reference to a method which includes soldering the blank to the base plate, the blank can be attached to the base plate by means of cement. The milled blank is subsequently detached from the base plate by dissolving the cement or otherwise breaking the cement bond.

I claim:

1. A method of manufacturing a spark erosion electrode, comprising
   1. providing a rough-cut electrode blank,
   2. soldering the blank to the upper surface of a base plate,
   3. fixing the base plate to the table of a milling machine having a spindle with said surface at right angles to the axis of the spindle,
   4. mounting a milling tool in said spindle,
   5. milling the side edges of the blank throughout the full depth of the blank by means of said milling tool, and
   6. removing the base plate from the table and detaching the milled blank from the base plate by fusing the solder.

2. A method according to claim 1 wherein the base plate is a steel plate having a layer of solder thereon, the solder being fused prior to attachment or removal of the blank by heating the base plate by placing it on a hot-plate.

3. A method according to claim 2 wherein, during milling, the end face of the milling tool extends down below the lower surface of the blank into the solder to ensure full-depth machining of the blank.

* * * * *